United States Patent
Andersson et al.

(10) Patent No.: US 10,659,205 B2
(45) Date of Patent: May 19, 2020

(54) METHOD AND APPARATUS FOR SEPARATE SCHEDULING OF UPLINK DATA AND REFERENCE SIGNAL TRANSMISSIONS IN A COMMUNICATION NETWORK

(71) Applicant: Telefonaktiebolaget LM Ericsson (publ), Stockholm (SE)

(72) Inventors: Mattias Andersson, Sundbyberg (SE); Niklas Andgart, Södra Sandby (SE); David Astely, Bromma (SE); Helka-Liina Määttänen, Helsinki (FI); Henrik Sahlin, Mölnlycke (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 102 days.

(21) Appl. No.: 15/752,761

(22) PCT Filed: Aug. 10, 2016

(86) PCT No.: PCT/SE2016/050744
§ 371 (c)(1),
(2) Date: Feb. 14, 2018

(87) PCT Pub. No.: WO2017/030484
PCT Pub. Date: Feb. 23, 2017

(65) Prior Publication Data
US 2018/0241524 A1    Aug. 23, 2018

Related U.S. Application Data (60) Provisional application No. 62/205,098, filed on Aug. 14, 2015.

(51) Int. Cl.
*H04W 72/12* (2009.01)
*H04L 5/00* (2006.01)
*H04W 72/04* (2009.01)

(52) U.S. Cl.
CPC .......... *H04L 5/0048* (2013.01); *H04L 5/0032* (2013.01); *H04L 5/0044* (2013.01);
(Continued)

(58) Field of Classification Search
CPC ...... H04W 72/04; H04W 88/08; H04W 76/00
See application file for complete search history.

(56) References Cited

U.S. PATENT DOCUMENTS 9,585,152 B2 * 2/2017 Sorrentino ............ H04L 5/0091
2011/0044297 A1    2/2011 Lee et al.
(Continued)

FOREIGN PATENT DOCUMENTS

WO    2015 008830 A1    1/2015

OTHER PUBLICATIONS

PCT International Search Report for International application No. PCT/SE2016/050744—dated Oct. 24, 2016.
(Continued)

*Primary Examiner* — Hassan A Phillips
*Assistant Examiner* — Prenell P Jones
(74) *Attorney, Agent, or Firm* — Sage Patent Group (57) ABSTRACT

According to one aspect of the teachings herein, a base station (20) schedules the transmission of uplink reference signals by a wireless device (16) separately from scheduling uplink data transmissions by the device (16). The separate scheduling may be done at specific times, under specific conditions, and with respect to specific devices (16) or groups of devices (16). Separate scheduling allows, for example, the base station (20) to use smaller scheduling intervals that are possible when uplink reference signals are integrally included in any scheduled uplink data transmission. As a further advantage, the density or number of uplink reference signal transmissions by a given device (16) can be adapted, e.g., based on channel conditions, data transmission
(Continued)

formats, etc. Correspondingly, a wireless device (16) is configured to receive separate grants for uplink data transmissions and uplink reference signal transmissions, and to make corresponding data and reference signal transmissions in accordance with those separate grants.

30 Claims, 8 Drawing Sheets (52) U.S. Cl.
CPC ..... *H04W 72/042* (2013.01); *H04W 72/0413* (2013.01); *H04W 72/12* (2013.01); *H04L 5/006* (2013.01)

(56) References Cited

U.S. PATENT DOCUMENTS

| | | | | |
|---|---|---|---|---|
| 2013/0195041 | A1* | 8/2013 | Papasakellariou | H04W 72/042 370/329 |
| 2014/0018085 | A1* | 1/2014 | Young | H04W 52/0235 455/450 |
| 2014/0029561 | A1* | 1/2014 | Kim | H04W 72/042 370/329 |
| 2015/0036566 | A1* | 2/2015 | Blankenship | H04W 52/281 370/311 |
| 2015/0181558 | A1* | 6/2015 | Yang | H04L 5/005 370/312 |
| 2016/0150490 | A1* | 5/2016 | Ouchi | H04W 72/12 455/522 |
| 2016/0255593 | A1* | 9/2016 | Blankenship | H04W 52/146 370/328 |
| 2017/0188356 | A1* | 6/2017 | Maeda | H04W 76/11 |
| 2017/0265176 | A1* | 9/2017 | Marinier | H04W 72/044 |
| 2017/0295546 | A1* | 10/2017 | Young | H04W 52/0235 |
| 2018/0013533 | A1* | 1/2018 | Yang | H04L 1/1671 |
| 2018/0248666 | A1* | 8/2018 | Aiba | H04L 5/0048 |

OTHER PUBLICATIONS

3GPP TSG-RAN WG2 Meeting #55; Seoul, South Korea; Title: Signalling Control Overhead due to Scheduling; Source: Nokia (R2-062758)—Oct. 9-13, 2006.

Study on Latency Reduction Techniques for LTE; RP-150310—Motivation for new proposed SI; Ericsson AB 2014—Sep. 2014.

PCT Written Opinion of the International Searching Authority for International application No. PCT/SE2016/050744—dated Oct. 24, 2016.

* cited by examiner

METHOD AND APPARATUS FOR SEPARATE SCHEDULING OF UPLINK DATA AND REFERENCE SIGNAL TRANSMISSIONS IN A COMMUNICATION NETWORK

PRIORITY

This nonprovisional application is a U.S. National Stage Filing under 35 U.S.C. § 371 of international Patent Application Serial No, PCT/SE2016/050744 filed Aug. 10, 2016, and entitled "Method And Apparatus For Separate Scheduling Of Uplink Data And Reference Signal Transmissions In A Communication Network" which claims priority to U.S. Provisional Patent Application No. 62/205,098 filed Aug. 14, 2015, both of which are hereby incorporated by reference in their entirety.

TECHNICAL FIELD

The present invention relates to communication networks and particularly relates to separately scheduling uplink data and reference signal transmissions by one or more wireless devices operating in a communication network.

BACKGROUND

Packet data latency is one of the performance metrics that vendors, operators and also end-users (via speed test applications) regularly measure. Latency measurements are done in all phases of a radio access network system lifetime, such as when verifying a new software release or system component, when deploying a system, and when the system is in commercial operation.

One performance metric that guided the design of Long Term Evolution, LTE, was better latency than previous generations of Radio Access Technologies, RATs, defined by the Third Generation Partnership Project, 3GPP. LTE is also now recognized by the end-users to be a system that provides faster access to the Internet and lower data latencies than previous generations of mobile radio technologies.

Packet data latency is important not only for the perceived responsiveness of the system; it is also a parameter that indirectly influences the throughput of the system. HyperText Transport Protocol/Transport Control Protocol, HTTP/TCP, is the dominant application and transport layer protocol suite used on the Internet today. According to HTTP Archive, http://httparchive.org/trends.php, the typical size of HTTP-based transactions over the Internet range from a few 10 s of Kbytes up to 1 Mbyte. In this size range, the TCP slow start period is a significant part of the total transport period of the packet stream. During TCP slow start, the "congestion window" used by TCP for defining the amount of traffic that can be outstanding, i.e., transmitted but not acknowledged, and packet latency limits how quickly the congestion window can be optimized. Hence, improved latency improves the average throughput for these types of TCP-based data transactions.

Radio resource efficiency in general is positively impacted by latency reductions. Lower packet data latency could increase the number of transmissions possible within a certain delay bound; hence higher BLER targets could be used for the data transmissions freeing up radio resources potentially improving the capacity of the system. There are a number of current applications that will be positively impacted by reduced latency in terms of increased perceived quality of experience: examples are gaming, real-time applications like VoLTE/OTT VoIP and multi-party video conferencing. In the future, there will be a number of new applications that will be more delay critical. Examples may be remote control/driving of vehicles, augmented reality applications in e.g. smart glasses, or specific machine communications requiring low latency.

Finally, it is appreciated herein that reduced latency of data transport may also indirectly give faster radio control plane procedures like call set-up/bearer set-up, due to the faster transport of higher-layer control signaling. For example, the LTE air interface is based on radio access network control and scheduling. These facts impact the latency performance because a transmission of data depends on a round trip of lower-layer control signaling.

Figure 1:
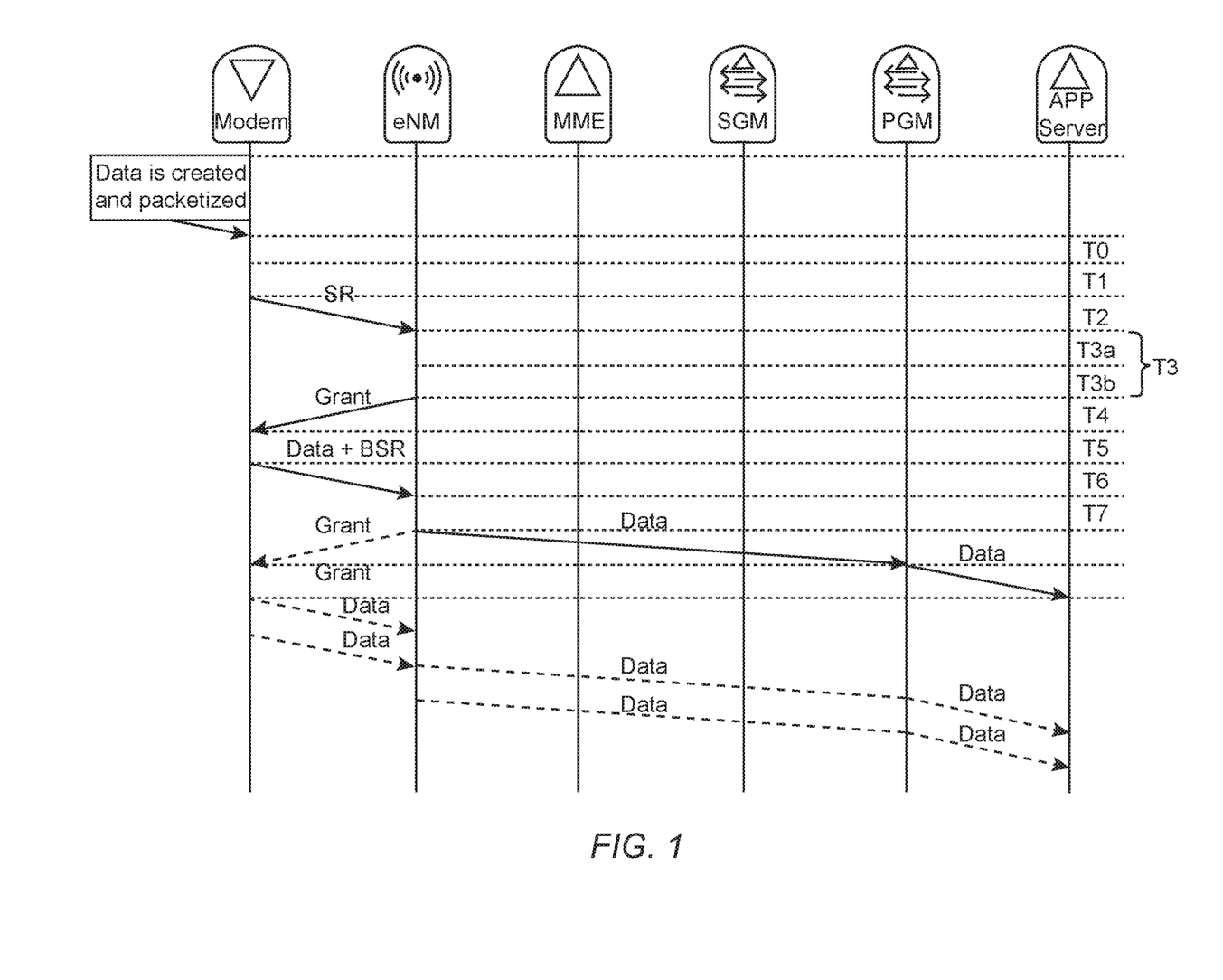
FIG. 1 is a signal flow diagram of example control signal timing for scheduling an uplink data transmission in a communication network.

Consider FIG. 1, which illustrates example control signaling timing for scheduling requests. The data is created by higher layers at T0, then the "User Equipment" or UE modem needs to send a scheduling request (SR) to the base station (an "eNB" in LTE). The eNB processes the SR and responds with a grant so the data transfer can start at T6 in the figure.

Correspondingly, it is recognized herein that one area to address when it comes to packet latency reductions is the reduction of the transport time of data and control signaling, which, according to the teachings herein, can be accomplished by allowing for shorter scheduling intervals. Here, a "scheduling interval" is the smallest unit of time allocated when scheduling resources. In LTE, scheduling intervals are referred to as "Transmission Time Intervals" or TTIs. Each TTI spans one sub-frame, which in turn spans two slots, each slot comprising six or seven OFDM symbol times in dependence on whether normal or extended Cyclic Prefixes (CP) are in use. The reduction of the processing time of control signaling at the involved receiver, e.g., the processing time needed by a UE to process a scheduling grant, is also recognized herein as an important aspect of reducing latency.

Because the time needed for turbo decoding depends on the code block size, latency can be reduced by reducing the code block size. Hence, if the code block size (or equivalently the transport block size) is reduced, the decoding result will be available earlier (for a given decoding capability in terms of the number of parallel decoders). If instead of transmitting a single large code block of length 6000 bits once every 1 ms, one transmits two consecutive blocks of length 3000 bits every 0.5 ms, one may roughly to a first order halve the decoding latency for each block while still sustaining the bit rate. It should be noted that some performance degradations may attend this approach, as a consequence of using shorter block lengths, and there may thus be a tradeoff between receiver performance and latency reductions.

Figure 2:
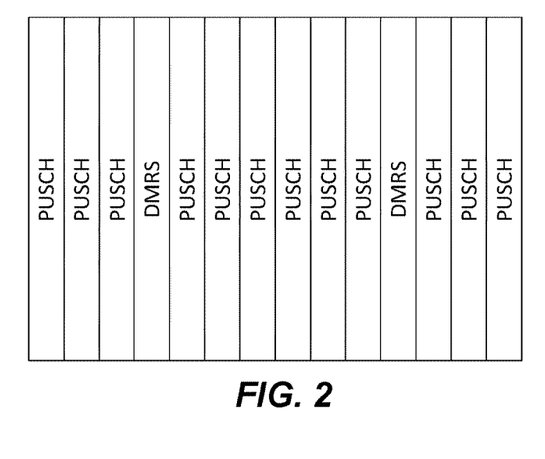
FIG. 2 is a diagram of DeModulation Reference Symbol (DMRS) positions in an existing Physical Uplink Shared Channel (PUSCH) transmission.
Figure 3:
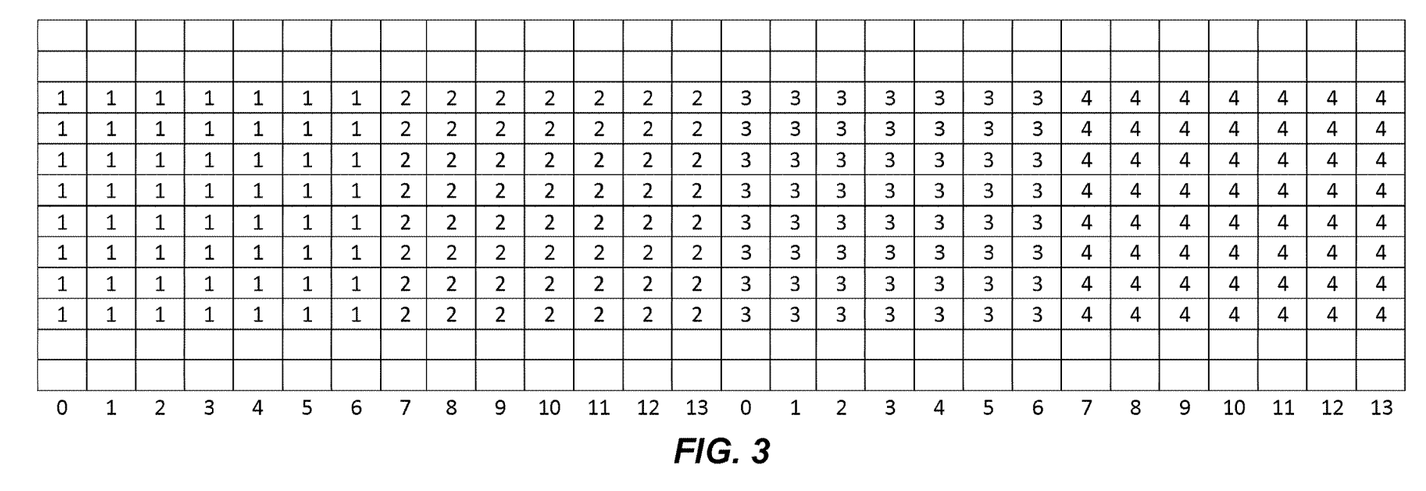
FIG. 3 is a diagram illustrating a number of OFDM symbol periods spanning a number of subframes, where the Transmission Time Interval (TTI) for PUSCH transmissions spans seven symbol times.

According to Release 8 of the LTE specifications, when a UE makes a scheduled uplink data transmission on the Physical Uplink Shared Channel or PUSCH, the transmission includes an uplink reference signal transmission in the middle of each slot spanned by the PUSCH subframe. One sees this arrangement in FIG. 2, which depicts the transmission of a DeModulation Reference Symbol or DMRS in the middle of each slot. In more detail, the vertical blocks in FIG. 2 correspond to individual symbol times—14 OFDM symbol times are shown, corresponding to two slots of 7 symbols per slot. In FIG. 2, each pair of slots constitutes a subframe and FIG. 3 depicts two such subframes.

SUMMARY

According to one aspect of the teachings herein, a base station schedules the transmission of uplink reference signals by a wireless device separately from scheduling uplink data transmissions by the device. The separate scheduling may be done at specific times, under specific conditions, and with respect to specific devices or groups of devices. Separate scheduling allows, for example, the base station to use smaller scheduling intervals that are possible when uplink reference signals are integrally included in any scheduled uplink data transmission. As a further advantage, the density or number of uplink reference signal transmissions by a given device can be adapted, e.g., based on channel conditions, data transmission formats, etc. Correspondingly, a wireless device is configured to receive separate grants for uplink data transmissions and uplink reference signal transmissions, and to make corresponding data and reference signal transmissions in accordance with those separate grants.

In one embodiment, a method at a base station configured for operation in a wireless communication network comprises separately scheduling an uplink data transmission and a corresponding uplink reference signal transmission by a wireless device. For example, separately scheduling the uplink data transmission and the corresponding uplink reference signal transmission by the wireless device comprises scheduling one or more uplink data transmissions by the wireless device to occur in one or more first scheduling intervals, and scheduling one or more corresponding uplink reference signal transmissions by the wireless device to occur in one or more second scheduling intervals, where the one or more second scheduling intervals are selected by the base station to occur within a defined temporal proximity of at least one of the first scheduling intervals.

In another embodiment, a base station is configured for operation in a wireless communication network and comprises radio transceiver circuitry configured to send signals to a wireless device and to receive signals from a wireless device and processing circuitry operatively associated with the radio transceiver circuitry. The processing circuitry is configured to separately schedule an uplink data transmission and a corresponding uplink reference signal transmission by the wireless device.

In another embodiment, a method is implemented at a wireless device configured for operation in a wireless communication network and includes receiving a first grant for an uplink data transmission and separately receiving a second grant for a corresponding uplink reference signal transmission by a wireless device. Further, the method includes the wireless device transmitting uplink data according to the first grant and transmitting uplink reference signals according to the second grant. Transmitting the uplink data according to the first grant and transmitting the uplink reference signals according to the second grant comprises, for example, transmitting the uplink data in a first scheduling interval allocated by the first grant and transmitting the uplink reference signals in a second scheduling interval allocated by the second grant.

In a related embodiment, a wireless device is configured for operation in a wireless communication network with radio transceiver circuitry and processing circuitry operatively associated with the radio transceiver circuitry. The radio transceiver circuitry is configured to send signals to the wireless communication network and to receive signals from the wireless communication network. The processing circuitry is configured to receiving a first grant for an uplink data transmission and separately receive a second grant for a corresponding uplink reference signal transmission by a wireless device, and transmit uplink data according to the first grant and transmit uplink reference signals according to the second grant.

Of course, the present invention is not limited to the above features and advantages. Those of ordinary skill in the art will recognize additional features and advantages upon reading the following detailed description, and upon viewing the accompanying drawings.

DETAILED DESCRIPTION

Figure 4:
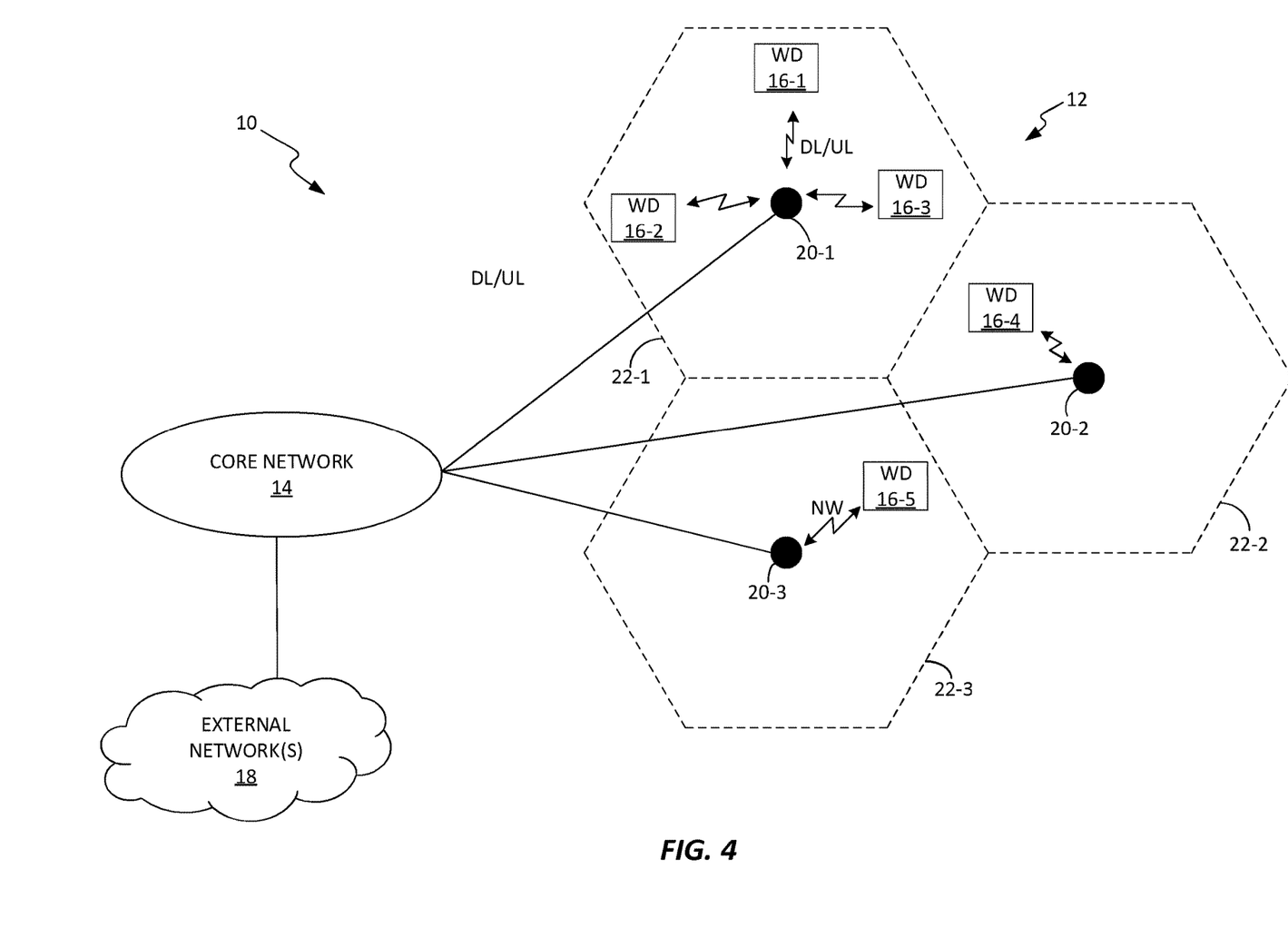
FIG. 4 is a block diagram of one embodiment of a communication network including one or more base station nodes and one or more wireless device nodes configured according to the teachings herein.

Unless suffixes are needed for clarity, reference numbers without suffixes are used to refer to corresponding elements in the drawings in both the singular and plural senses. With that in mind, FIG. 4 illustrates one embodiment of a wireless communication network 10 that is configured according to the teachings herein. The illustrated network 10 includes a Radio Access Network, RAN, 12 and a Core Network, CN, 14. The network 10 communicatively couples any number of wireless devices 16 to one or more external networks 18, such as the Internet or another packet data network.

The RAN 12 includes a number of base stations 20-1, 20-2 and 20-3, which control or otherwise provide the air interface used for wirelessly connecting wireless devices 16 to the network 10. According to the teachings herein, at least one of the base stations 20 is configured to perform separate scheduling of uplink data transmissions and uplink reference signal transmissions by at least one of the wireless devices 16, according to the teachings herein. This requires, of course, that the wireless device 16 can be configured to support the separate scheduling of uplink data transmissions and uplink reference signal transmissions.

Each base station 20 provides one or more "cells" 22. As a non-limiting example, a cell 22 may be understood as the allocation or usage of certain radio resources, such as a specific carrier frequency, within a certain geographic coverage area. In the diagram, the base station 20-1 provides a cell 22-1, the base station 20-2 provides a cell 22-2, and the base station 20-3 provides a cell 22-3. Of course, a given base station 20 may provide more than one cell 22, e.g., in the case of multi-carrier operation, and the teachings herein are not limited to arrangement of base stations 20 and cells 22 depicted in FIG. 4.

For example, the cell sizes may be adaptive or non-uniform. In the latter case, the network 10 may comprise a heterogeneous network where one or more large cells, referred to as "macro" cells are overlaid by one or more smaller cells, referred to a "micro," "pico," or "femto," cells. These smaller cells are provided by low-power access points and may be used as service hotspots that provide higher data rate services and/or may be used to extend or fill in the service coverage provided by the macro cells. In some heterogeneous deployments, the micro cells use the same radio access technology used by the macro cells.

Regardless of the cell configuration details, the network 10 is an example embodiment comprises a Long Term Evolution or LTE network, or a LTE-Advanced network, meaning that the network 10 is configured to operate according to the applicable specifications promulgated by the Third Generation Partnership Project or 3GPP. In the LTE context, the base stations 20 referred to as eNBs or eNodeBs—provide an air interface for wirelessly connecting the wireless devices 16 to the network 10, where the air interfaces use Orthogonal Frequency Division Multiple Access or OFDMA on the downlink and use Single Carrier Frequency Division Multiple Access or SC-FDMA on the uplink. It will be appreciated that the wireless devices 16 are configured to operate with the air interface, spectrum, and protocols adopted by the network 10 in the LTE case, and in other cases.

The network 10 schedules at least some types of uplink data transmissions by the wireless devices 16. For example, in LTE, Physical Uplink Shared Channel, PUSCH, transmissions are scheduled by a base station 20, based on the base station sending uplink grants to respective ones of the wireless devices 16 being served by the base station 20. The base station 20 uses associated reference signals transmitted from the wireless devices 16 to demodulate or otherwise process the scheduled uplink data transmissions. As explained in the Background, the conventional approach is for the reference signals to be integrated into the uplink data transmissions, such that a wireless device 16 automatically includes one or more reference signals, e.g., Sounding Reference Symbols or SRS, in each scheduled uplink data transmission.

Unlike that conventional approach, one or more of the base stations 20 in FIG. 4 use separate scheduling of uplink reference signal transmissions and uplink data transmissions by a wireless device 16, such that a given scheduling interval is allocated for data transmission and another given scheduling interval is allocated for reference signal transmission. In some embodiments, however, separate scheduling is not necessarily used at all times, or under all conditions, or at least not with respect to all wireless devices in the network. For example, there may be legacy devices that do not support the separate scheduling of uplink data and uplink reference signal transmissions.

In the advantageous context of separate scheduling, the scheduling intervals used for data transmission need not be the same size as the scheduling intervals used for reference signal transmission, and the number of reference signal transmissions relative to any given number of data transmissions may be adapted, such as in response to changing channel conditions, and may be managed on a per device basis. In an LTE example, the teachings herein enable the minimum scheduling interval to be as small as one OFDM symbol time. Data transmissions as short as one OFDM symbol may be scheduled, with one or more corresponding reference signal transmissions scheduled separately from such data transmissions. This approach enables the practicing base station 20 to use "sub-subframe" scheduling on the uplink, meaning that scheduling intervals smaller than one subframe can be defined and used for separately scheduling uplink data and reference signal transmissions. In other words, the uplink scheduling may be performed at the OFDM symbol period granularity.

One or more of the wireless devices 16 support separate uplink data and reference signal transmissions, and, more generally, all of the wireless devices 16 are configured for operation in the network 10. As such, each wireless device 16 is configured to communicate according to the signal structure, spectrum, and protocols used by the network 10.

It will also be appreciated that the network diagram is simplified for ease of discussion and that the network 10 may include additional examples of any one or more of the illustrated entities and may include other entities not illustrated. For example, the CN 14 may include Mobility Management Entities or MMEs, Serving Gateways or SGWs, a Packet Gateway or PGW, and one or more other nodes, such as positioning nodes, Operations & Maintenance nodes, charging and billing nodes or systems, etc.

Figure 5:
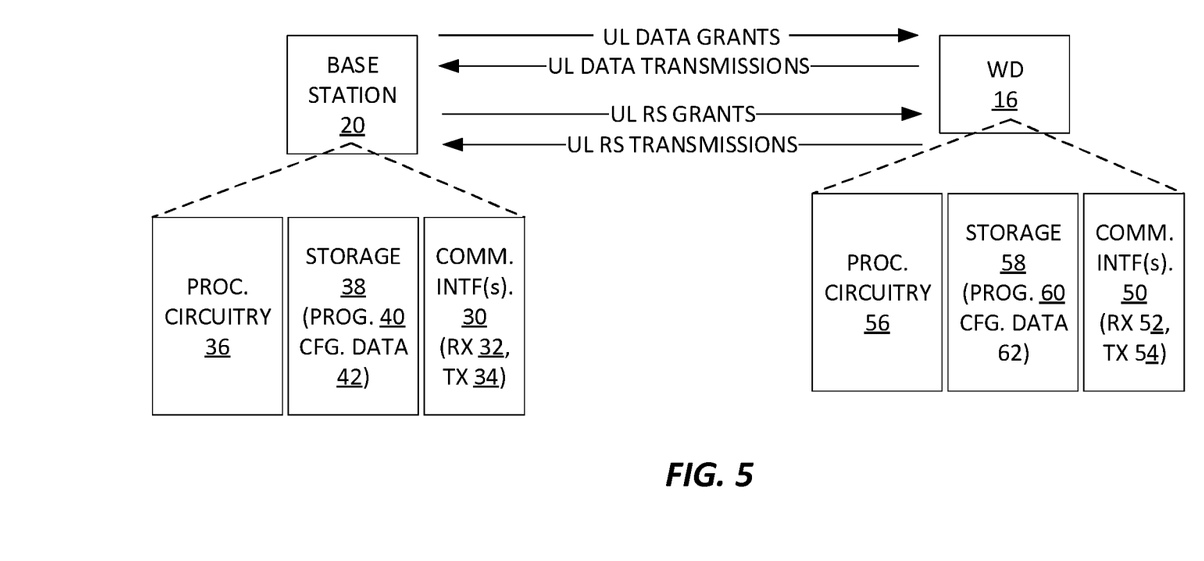
FIG. 5 is a block diagram of example embodiments of a base station and a wireless device configured according to the teachings herein.

FIG. 5 illustrates example details for one embodiment of a base station 20 and a wireless device 16. The base station 20 includes one or more communication interfaces 30, including radio receiver circuitry 32 and radio transmitter circuitry 34. For example, the radio receiver circuitry 32 and the radio transmitter circuitry 34 comprise any number of radio receivers and transmitters and associated power control and signal processing circuits, for use in receiving signals from and transmitting signals to any number of wireless devices 16 operating in the network 10.

In some embodiments, the communication interface(s) 30 also includes inter-base station interfaces that are configured for exchanging signaling within one or more other base stations 20, such as neighboring base stations for any number of reasons, such as handover, interference coordination, etc. Still further, in some embodiments, the one or more communication interfaces 30 include one or more backhaul connections that communicatively couple the base station 20 to the CN 14. In a LTE example, the base station 20 has "X2" interfaces to one or more other base stations 20, and has "S1" interfaces to one or more Gateway nodes and to one or more Mobility Management Entities.

The base station 20 further includes processing circuitry 36 and associated storage 38. The processing circuitry 36 comprises, for example, one or more microprocessors, Digital Signal Processors, DSPs, Field Programmable Gate Arrays, FPGAs, Application Specific Integrated Circuits, ASICs, and/or other digital processing circuitry. In turn, the storage 38 comprises one or more types of computer-readable medium, such as a mix of volatile, working memory and non-volatile configuration and program memory or storage. Non-limiting examples of volatile storage includes SRAM and DRAM, while non-limiting examples of non-volatile storage include solid-state or other disk storage, FLASH, and EEPROM.

It will be appreciated that the base station teachings disclosed herein may be implemented in the base station 20 using fixed or programmable circuitry, or using some combination of both fixed and programmable circuitry. In at least some embodiments, the base station functionality taught herein is realized at least in part through the programmatic configuration of digital processing circuitry, based on the execution by that circuitry of stored computer program instructions. To illustrate this example case, FIG. 5 depicts the storage 38 as storing a computer program 40 and configuration data 42.

The computer program 40 may comprise more than one program or routine for execution by the same or by different processing circuits within the processing circuitry 38. In any case, the storage 38 provides non-transitory storage for the computer program 40. Here, "non-transitory" does not necessarily mean permanent or unchanging storage but does connote storage of at least some persistence, i.e., the computer program instructions are stored for retrieval and execution.

With these example details in mind, in one or more embodiments contemplated herein, a base station 20 is configured for operation in a wireless communication network 10 and comprises radio transceiver circuitry 32, 34 configured to send signals to a wireless device 16 and to receive signals from the wireless device 16. The base station 20 further comprises processing circuitry 36 that is operatively associated with the radio transceiver circuitry 32, 34 and is configured to separately schedule an uplink data transmission and a corresponding uplink reference signal transmission by the wireless device 16.

In an example embodiment, the processing circuitry 36 is configured to separately schedule the uplink data transmission and the corresponding uplink reference signal transmission by the wireless device 16, by scheduling one or more uplink data transmissions by the wireless device 16 to occur in one or more first scheduling intervals, and scheduling one or more corresponding uplink reference signal transmissions by the wireless device 16 to occur in one or more second scheduling intervals. The processing circuitry 36 is configured to select the second scheduling intervals to occur within a defined temporal proximity of at least one of the first scheduling intervals. Here, a "corresponding" uplink reference signal transmission by a wireless device 16 corresponds to a given uplink data transmission by the wireless device 16, based on occurring within a defined temporal proximity of the given uplink data transmission and spanning at least the same frequency interval as the uplink data transmission.

In some embodiments, the processing circuitry 36 is configured to separately schedule the uplink data transmission and the corresponding uplink reference signal transmission by a wireless device 16 by, for one or more given uplink data transmissions by the wireless device 16, scheduling one or more corresponding uplink reference signal transmissions by the wireless device 16 on an as needed basis. For example, the processing circuitry 36 is configured to separately schedule the uplink data transmission and the corresponding uplink reference signal transmission by the wireless device 16, by scheduling the uplink data transmission and conditionally scheduling the uplink reference signal transmission. The conditional scheduling of the uplink reference signal transmission is based on determining whether or not the base station 20 has a current channel estimate that is valid for the uplink data transmission.

In some embodiments, or in some example cases, the scheduling of the uplink data transmission is done in response to determining that the wireless device 16 has uplink data to send. However, in other embodiments, or in other example cases, the base station 20 sends an uplink grant even if the wireless device 16 has no data to transmit, or even if the base station 20 does not yet know whether or not the wireless device 16 has data to transmit. Such grants may be provided on a "just in case" basis and can be done to reduce latency.

Broadly, in one or more embodiments, the processing circuitry 36 is configured to separately schedule the uplink data transmission and the corresponding uplink reference signal transmission by a wireless device 16, by scheduling one or more uplink data transmissions by the wireless device 16 and conditionally scheduling one or more corresponding uplink reference signal transmissions by the wireless device 16 on an as-needed basis. For example, the processing circuitry 36 is configured to conditionally schedule the one or more corresponding uplink reference signal transmissions by the wireless device 16 on an as-needed basis by at least one of: varying when or how many uplink reference signal transmissions by the wireless device 16 are scheduled, in dependence on the processing circuitry 36 evaluating how rapidly uplink channel conditions are changing between the base station 20 and the wireless device 16; and varying when or how many uplink reference signal transmissions by the wireless device 16 are scheduled, in dependence on a transmission format or formats associated with the one or more uplink data transmissions.

With respect to any of the above embodiments, the base station 20 is, for example, a serving base station with respect to the involved wireless device 16, or otherwise provides a radio connection to the communication network 10, for the wireless device 16. Further, in at least one embodiment, the communication network 10 is configured as a Long Term Evolution (LTE) network, or as a LTE-Advanced network, according to Third Generation Partnership Project (3GPP) specifications. In such embodiments, the uplink reference signal transmissions in question comprise DeModulation Reference Symbol (DMRS) transmissions, and the uplink data transmissions in question comprise Physical Uplink Shared Channel (PUSCH) transmissions or Physical Uplink Control Channel (PUCCH) transmissions. That is, an "uplink data transmission" may comprise the transmission of user traffic or control information.

In at least one such embodiment, the processing circuitry 36 is configured to separately schedule an uplink data transmission and a corresponding uplink reference signal transmission by a wireless device 16, based on one of: being configured to send a first Downlink Control Information (DCI) message to the wireless device 16, to schedule the uplink data transmission, and send a second DCI message to the wireless device 16, to schedule the corresponding uplink reference signal transmission; or being configured to send a DCI message to the wireless device 16 that includes scheduling information for both the uplink data transmission and the corresponding uplink reference signal transmission.

In another broad example, the processing circuitry 36 is configured to separately schedule the uplink data transmission and the corresponding uplink reference signal transmission by a wireless device 16 based on: determining that the wireless device 16 has data to send; determining that uplink channel conditions between the base station 20 and the wireless device 16 are stable, according to one or more channel metrics; and making a semi-persistent scheduling allocation to the wireless device 16, for sending corresponding uplink reference signal transmissions in association with sending the data in one or more scheduled uplink data transmissions.

In another example applicable to at least some of the preceding example base station embodiments, the uplink signal structure used by a wireless device 16 and the base station 20 defines transmission frames that are divided into subframes, with the subframes further divided into symbol periods. Here, the base station processing circuitry 36 is configured to separately schedule the uplink data transmission and the corresponding uplink reference signal transmission by the wireless device 16, based on scheduling one or more uplink data transmissions by the wireless device 16 and scheduling one or more corresponding uplink reference signal transmissions by the wireless device 16 at a sub-subframe scheduling resolution. The sub-subframe scheduling resolution has a granularity of at least one symbol period, but defines a scheduling interval of less than one subframe.

Consequently, the base station 20 can schedule uplink data transmissions using scheduling intervals as short as one OFDM symbol period, and can separately schedule corresponding uplink reference signal transmissions as short as one OFDM symbol period. Here, unless otherwise noted, "scheduling" an uplink data transmission or "scheduling" an uplink reference signal transmission can be understood as the base station 20 making a scheduling decision or otherwise determining a particular resource allocation—e.g., selecting particular frequency resources for use at a particular time—and sending signaling to the wireless device 16 that indicates the resource grant.

Figure 6:
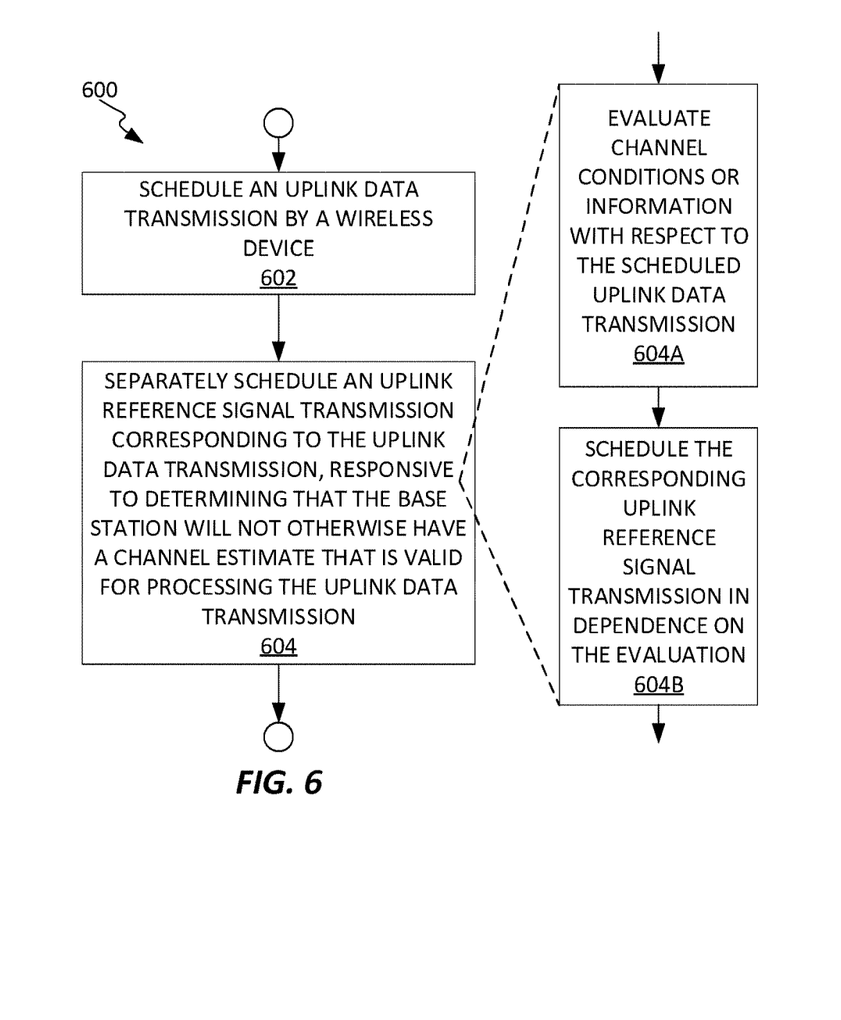
FIG. 6 is a logic flow diagram of one embodiment of a method of processing at a base station.

FIG. 6 illustrates an example embodiment of a method 600 of processing at a base station 20, for separately scheduling an uplink data transmission and a corresponding uplink reference signal transmission by a wireless device 16. The method 600 includes scheduling an uplink data transmission by the wireless device 16 (Block 602), and separately scheduling a corresponding uplink reference signal transmission by the wireless device 16, responsive to determining that the base station 20 will not otherwise have a channel estimate that is valid for processing the uplink data transmission (Block 604). Scheduling the uplink reference signal transmission in this example involves conditional processing, such as where the base station 20 evaluates channel conditions or information with respect to the scheduled uplink data transmission (Block 604A) and schedules the corresponding uplink reference signal transmission in dependence on that evaluation (Block 604B).

The evaluation comprises, for example, determining whether the base station 20 has channel information that is valid with respect to the times and/or frequencies associated with the scheduled uplink data transmission. In one example, for a current channel estimate at the base station for the involved wireless device 16 to be valid with respect to the scheduled uplink data transmission, it must have occurred, or must occur, within a defined temporal proximity to the scheduled uplink data transmission, and it must at least span the same frequency interval spanned by the scheduled uplink data transmission. More broadly, the base station 20 determines that the base station 20 will not otherwise have a channel estimate that is valid for processing a given uplink data transmission, based on determining that any channel estimates already determined by the base station 20 will not have the requisite temporal and spectral relevance, and further determining that no other temporally and spectrally relevant uplink reference signal transmissions will be received from the wireless device 16, absent the base station scheduling the uplink reference signal transmission in question.

In general, for an uplink reference signal transmission by a wireless device 16 to "correspond" with an uplink data transmission by the wireless device 16, it must be relevant to the uplink data transmission. With an OFDM-based air interface, for example, relevance may be defined as temporal and spectral relevance, which is another way of saying that the uplink reference signal transmission should be close enough in time to the uplink data transmission to reasonably assume that the channel conditions are the same or similar, and it should use frequency resources at least spanning the same frequency interval as used by the uplink data transmission.

The defined temporal proximity may be defined in terms of OFDM symbol periods, e.g., a channel estimate made more than "x" OFDM symbol times before or after the scheduled uplink data transmission is considered invalid or stale. The defined temporal proximity may be adjusted in view of observed channel variability, such that a given channel estimate may be considered valid for a slowly changing channel, whereas the same estimate would be considered invalid for a rapidly changing channel. The spectral proximity may be ensured by using the same frequency resources—e.g., the same OFDM subcarriers—as used for the uplink data transmission, or by at least using OFDM subcarriers falling within the same frequency interval spanned by the subcarriers used for the uplink data transmission. The frequency interval spanned by the uplink reference signal transmission may be wider than the frequency interval spanned by the uplink data transmission.

The evaluation of Step 604A may additionally, or may alternatively, involve an assessment by the base station 20 of the "robustness" of the scheduled uplink data transmission(s) in question. For example, different transmission formats may use different levels of information encoding and thus have greater or lesser likelihoods of being successfully received at the base station 20. Thus, in two separate instances involving substantially the same channel conditions and substantially the same channel knowledge at the base station 20, the base station 20 in one instance will not schedule an uplink reference signal transmission because a more robust transmission format is used for the involved uplink data transmission, and in the other instance the base station 20 will schedule an uplink reference signal transmission because a less robust transmission format is used for the involved uplink data transmission.

Turning back to the wireless devices 16 seen in FIG. 4, it will be appreciated that the wireless devices 16 may not all be of the same type and that any given wireless device 16 may comprise essentially any type of apparatus configured for operation in the network 10. A given wireless device 16 may be mobile or may be operated in a fixed position, and it may be intended for a variety of personal communication tasks, or it may be dedicated to certain types of communications.

In a non-limiting example, any one or more of the wireless devices 16 comprise Machine Type Communication, MTC, devices configured for Machine-to-Machine, M2M, services. In the same or another example, one or more of the wireless devices 16 comprise cellular radio telephones, such as smartphones or feature phones, or comprise a computer device such as a tablet or a laptop having wireless connectivity.

The example wireless device 16 shown in FIG. 5 includes a communication interface 50 having a radio receiver 52 and a radio transmitter 54 that are configured for operation according to the air interface of the network 10. The wireless device 16 further includes processing circuitry 56, which includes or is associated with storage 58. The storage 58 includes, for example, one or more types of computer-readable medium, such as a mix of volatile, working memory and non-volatile configuration and program memory or other storage.

The communication interface 50 may comprise a mix of analog and digital circuits. For example, the receiver 52 in one or more embodiments comprises a receiver front-end circuit that is not explicitly shown in FIG. 5. The receiver front-end circuitry generates one or more streams of digital signal samples corresponding to antenna-received signal or signals, for processing by one or more receiver processing circuits—e.g., baseband digital processing circuitry and associated buffer memory that buffer and operate on the digital samples. Example operations include linearization or other channel compensation, possibly with interference suppression, and symbol demodulation/detection and decoding, for recovering information conveyed in the signals received at the wireless device 16.

The processing circuitry 56 processes such information and generates information for transmission. The processing circuitry 56 in this regard comprises one or more digital processing circuitry, such as one or more microprocessors, DSPs, ASICs, FPGAs, etc. More generally, the processing circuitry 56 may be implemented using fixed circuitry or programmed circuitry, or a mix of fixed and programmed circuitry. In an example embodiment, the storage 58 comprises a computer-readable medium that stores a computer program 60 in a non-transitory manner. The processing circuitry 56 in such embodiments is at least partly configured according to the teachings herein, based on its execution of the computer program instructions comprising the computer program 60. The storage 58 also may store configuration data 62, for use by the processing circuitry 56.

With these example implementation details in mind, a wireless device 16 according to one or more embodiments contemplated herein is configured for operation in a wireless communication network 10 and comprises radio transceiver circuitry 52, 54 configured to send signals to the network 10 and to receive signals from the network 10. The example wireless device 16 further comprises processing circuitry 56 that is operatively associated with the radio transceiver circuitry 52, 54. The processing circuitry 56 is configured to receive a first grant for an uplink data transmission and separately receive a second grant for a corresponding uplink reference signal transmission by the wireless device 16. The processing circuitry 56 is further configured to transmit uplink data according to the first grant and transmit uplink reference signals according to the second grant.

For example, in response to the first and second grants, the processing circuitry 56 is configured to transmit the uplink data in a first scheduling interval allocated by the first grant and transmit the uplink reference signals in a second scheduling interval allocated by the second grant. In at least one embodiment, the first grant allocates frequency resources in a first frequency interval, and the second grant allocates frequency resources at least spanning the first frequency interval. The second grant may be a semi-persistent scheduling grant and the processing circuitry 56 is, in turn, configured to transmit uplink reference signals in each of a number of scheduling intervals implicated by the semi-persistent scheduling grant.

In the same or another embodiment, the processing circuitry 56 is configured to autonomously decide to transmit an uplink reference signal corresponding to a given uplink data transmission by the wireless device 16, responsive to determining that there would otherwise be no uplink reference signal transmission having temporal and spectral relevance to the given uplink data transmission. As an example, the processing circuitry 56 detects that no corresponding uplink reference signal transmission has been made and that the base station has not otherwise scheduled a corresponding uplink reference signal transmission. Here, it shall be understood that an uplink reference signal transmission is a "corresponding" transmission with respect to a given uplink data transmission to the extent that the uplink reference signal transmission has temporal and spectral relevance to the uplink data transmission.

Figure 7:
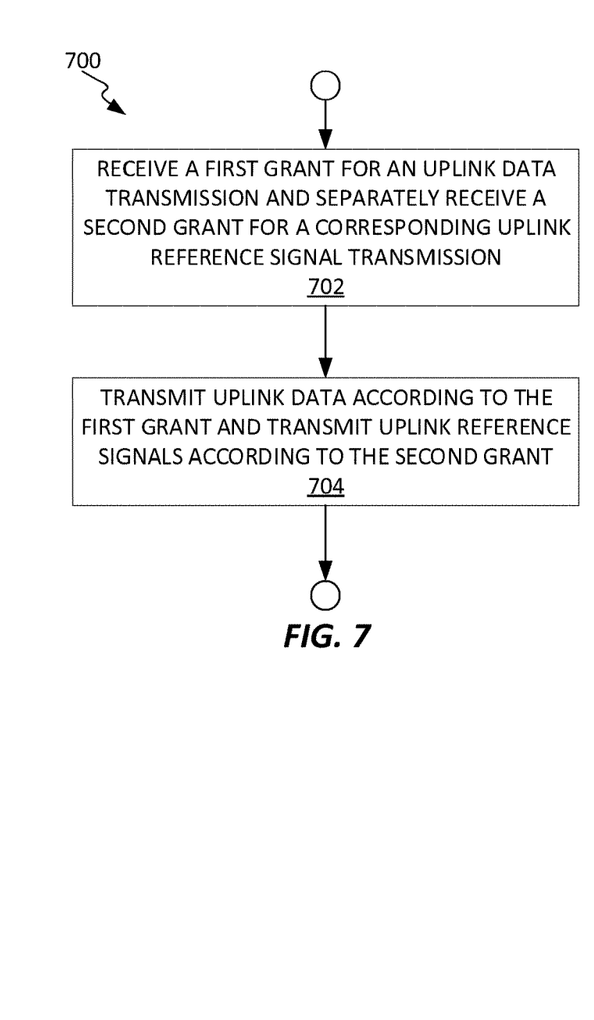
FIG. 7 is a logic flow diagram of one embodiment of a method of processing at a wireless device.

FIG. 7 illustrates an example method 700 at a wireless device 16 that is configured for operation in a wireless communication network 10. The method 700 includes receiving (Block 702) a first grant for an uplink data transmission and separately receiving a second grant for a corresponding uplink reference signal transmission by the wireless device 16, transmitting (Block 704) uplink data according to the first grant and transmitting uplink reference signals according to the second grant.

The wireless device 16 may be essentially any type of apparatus that is configured to operate within the network 10. Non-limiting examples include cellular radiotelephones, such as smart phones or feature phones, or other mobile devices, such as tablets or laptop computers having wireless network connectivity. However, the wireless device 16 in question is not necessarily mobile, and it may be configured for essentially any type of communications, such as multimedia services, MTC services, etc.

Further, in addition to being configured for communication via the network 10, an example wireless device 16 may have additional communication capabilities, such as Device-to-Device (D2D) capabilities. Indeed, the ability of the device 16 to receive, process and respond to separate grants for uplink data and uplink reference signal transmissions has similar advantages in the D2D context. Consequently, in one or more embodiments contemplated herein, the separate grants are for separate D2D transmissions of data and reference signals, such as where a first wireless device 16 makes a D2D transmission of data to a second wireless device 16, and makes a separate, corresponding D2D transmission of reference signals to the second wireless device 16.

In the parlance of the 3GPP, the wireless devices 16 are referred to as user equipments or UEs and, in an example LTE embodiment, the base stations 20 are referred to as eNBs or eNodeBs and the uplink reference signals are, for example, DRMS. Further, the LTE air interface defines repeating frames of ten subframes each, with each subframe divided into two slots. Each slot comprises six or seven OFDM symbol times, in dependence on whether normal or extended Cyclic Prefixes (CP) are in use. Details regarding the existing LTE air interface are found in the following references: 3GPP TS 36.201—*Evolved Universal Terrestrial Radio Access (E-UTRA); LTE physical layer; General description;* 3GPP TS 36.211—*Evolved Universal Terrestrial Radio Access (E-UTRA); Physical channels and modulation;* 3GPP TS 36.212—*Evolved Universal Terrestrial Radio Access (E-UTRA); Multiplexing and channel coding;* 3GPP TS 36.213—*Evolved Universal Terrestrial Radio Access (E-UTRA); Physical layer procedures;* and 3GPP TS 36.214—*Evolved Universal Terrestrial Radio Access (E-UTRA); Physical layer; Measurements.*

Using the LTE terminology, consider an example case that defines a set of DMRS transmission opportunities as OFDM symbols within a subframe on which a UE is allowed to transmit DMRS. The OFDM symbol times available for DMRS transmission by the UE could either be fixed, e.g., at least semi-persistently allocated to symbol times 3 and 10 within the OFDM subframe, or they could be any symbol in the subframe based on ongoing scheduling decisions by the eNB and/or decision-making at the UE. The frequency allocation for the DMRS could either be given explicitly in a grant received by the UE, or could be provided to the UE via higher layer configuration signaling, or could be chosen by the UE from a small subset of possible allocations. In the latter case, the LTE network may indicate the subset to the UE via higher layer signaling, and it should be noted that different DMRS opportunities can be associated with different frequency allocations.

In one example embodiment, the LTE network makes separate DMRS grants to a UE via DCI signaling. These separate grants may be made on a per-UE basis, or may be made for groups of UEs that transmit code- or frequency-multiplexed DMRSs in the same transmit opportunity. The DMRS-grant in an example case covers a period that is longer than the scheduling interval in use. For example, assume that the scheduling interval in use is one OFDM symbol time. The eNB knows, from Buffer Status Reports (BSRs) for example, that a UE has data transmit and it knows, from CQI reports for example, that the uplink channel conditions for the UE are fixed or slowly changing.

Consequently, the eNB predicts upcoming frequency allocations for scheduling uplink data transmissions by the UE, and correspondingly "pre-schedules" DMRS transmissions by the UE on those frequency allocations. The eNB separately schedules the uplink data transmissions by the UE at the scheduling interval granularity of one OFDM symbols.

In at least some contemplated embodiments, the DCI message transmitted by an eNB for a downlink Physical Downlink Shared Channel (PDSCH) assignment carries an UL DMRS grant. In at least one such embodiment, FTP ACK/NACK feedback is provided by the UE for the DL PDSCH assignment, and an uplink reference signal transmission can be prescheduled for that purpose. A similar approach may be used for prescheduling DRMS transmissions by a UE on the same frequency allocations as used for Physical Uplink Control Channel (PUCCH) transmissions by the UE.

In another example, consider the case where a UE receives an UL grant for a data transmission (where in this example context could be a PUSCH or PUCCH transmission) and has not transmitted a DMRS for the allocated frequency resources in the previous k symbols, where the integer value of k might depend on the length in OFDM symbols of the grant. Advantageously, in response to recognizing these circumstances, the UE transmits a DMRS in the next DMRS opportunity and transmits its data on the granted PUSCH resources. Optionally, this same logic could be extended to trigger the beginning of repeated DMRS transmissions by the UE during a longer time-period. In general, the frequency allocation of the first DMRS used for the UL grant need not be the same as the frequency allocation(s) of the triggered, repeated DMRS transmission, which could be configured though higher-layer signaling between the network and the UE.

In another example embodiment, a UE is scheduled to transmit DMRS as above, continuously or during a longer period, with relatively long distances between DMRS transmissions. In this mode, relatively recent DMRS is always available, allowing for UL transmissions that use robust encoding, e.g. ACK/NACK transmissions or data transmissions using a low-order Modulation and Coding Scheme (MCS). Then, when a transmission with higher data rates is due to begin, DMRS grants for denser DMRS transmissions are provided. This example illustrates the broader configuration possibility contemplated earlier herein; namely, the density of uplink reference signal transmissions by a given UE may be dynamically adapted in dependence on the degree of robustness of the corresponding uplink data transmissions.

Now consider further refinements or extensions of the above teachings. In an example scenario, the eNB sends a separate uplink reference signal grant to a first UE (UE1) and adapts the scheduling of a second UE (UE2) based on whether or not it detects the scheduled uplink reference signal transmission by UE1. In another example, certain OFDM symbol times are "reserved" as reference signal transmission opportunities and a given UE takes advantage of one or more of those opportunities on its own, e.g., to ensure that one or more of its data transmissions have corresponding reference signal transmissions, and/or the base station instructs the UE to transmit at one or more of the predefined opportunities. For example, a given OFDM symbol time per subframe slot may be designated as a "rescue" opportunity to be used by a UE to provide a reference signal transmission in correspondence with a data transmission.

In all such cases, the eNB in one or more embodiments is configured to account for the predefined opportunities and, optionally, its knowledge regarding the known or possible use of those opportunities by other UEs having data to transmit, when scheduling a given UE. More broadly, the processing circuitry 36 of an eNB or other network base station 20 is configured in one or more embodiments to implement separate scheduling of uplink data and uplink reference signal transmissions by any number of devices 16, and to account for scheduled/pre-scheduled uplink reference signal transmissions by any number of UEs, to avoid reference signal transmission collisions among the UEs.

Figure 8:
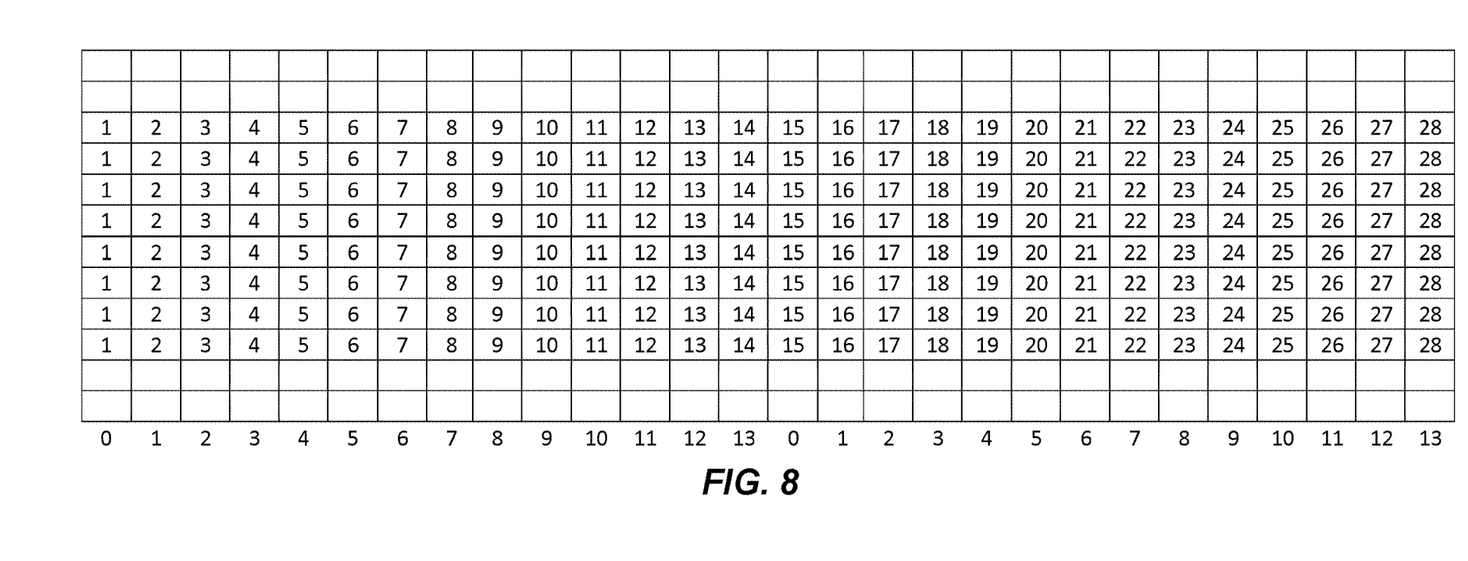
FIG. 8 is a diagram illustrating a number of OFDM symbol periods spanning a number of subframes, where the Transmission Time Interval (TTI) spans one symbol time.

With these advantageous configurations, TTI granularities as fine as one OFDM symbol time may be used for scheduling uplink data and reference signal transmissions. This arrangement is seen in FIG. 8, which illustrates TTIs of one OFDM symbol time and in total depicts OFDM symbol times for two LTE subframes, where each subframe comprises two slots of seven symbols each.

Figure 9:
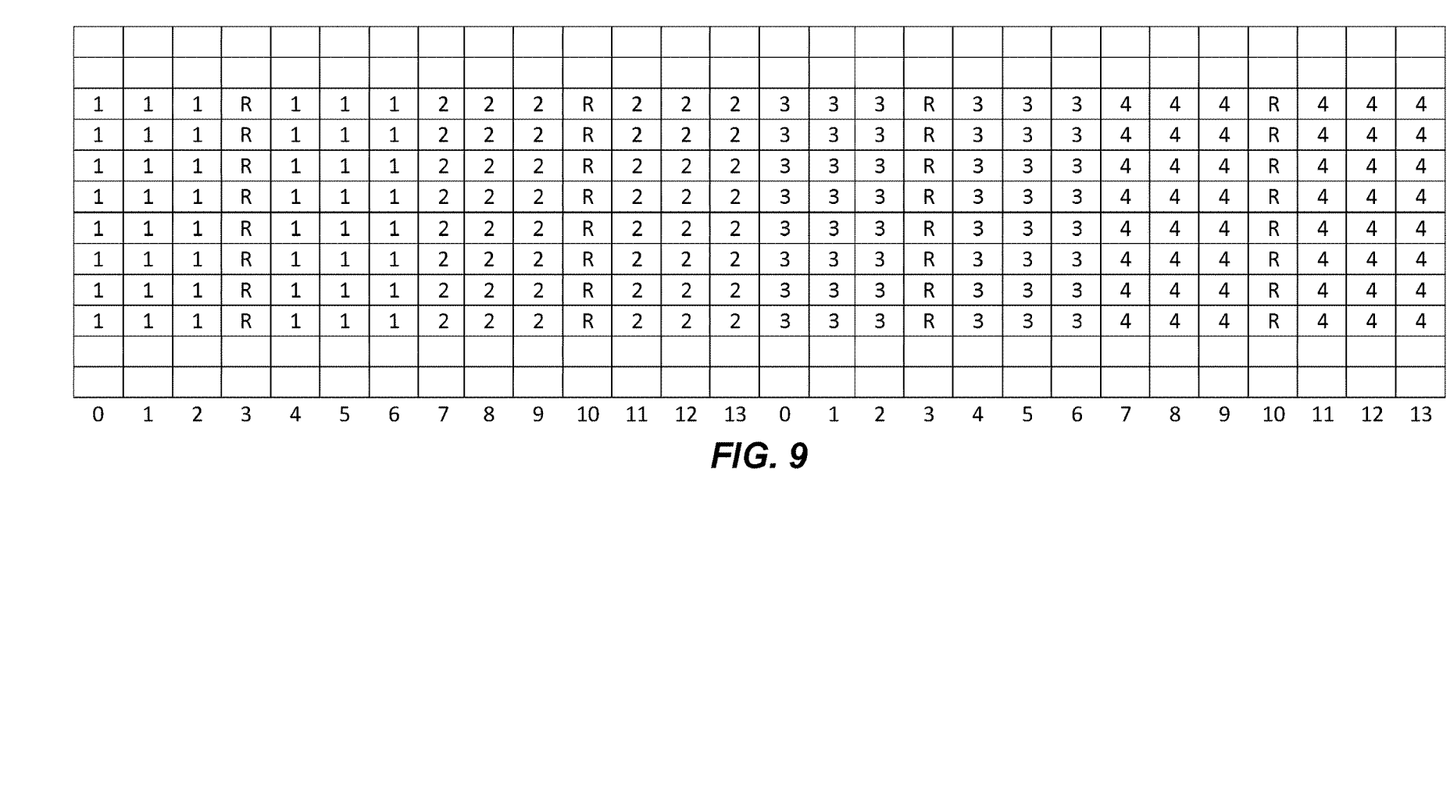
FIG. 9 is a diagram illustrating PUSCH transmissions based on seven symbol times per TTI, with a DMRS transmission opportunity in every third and tenth symbol times of each subframe.
Figure 10:
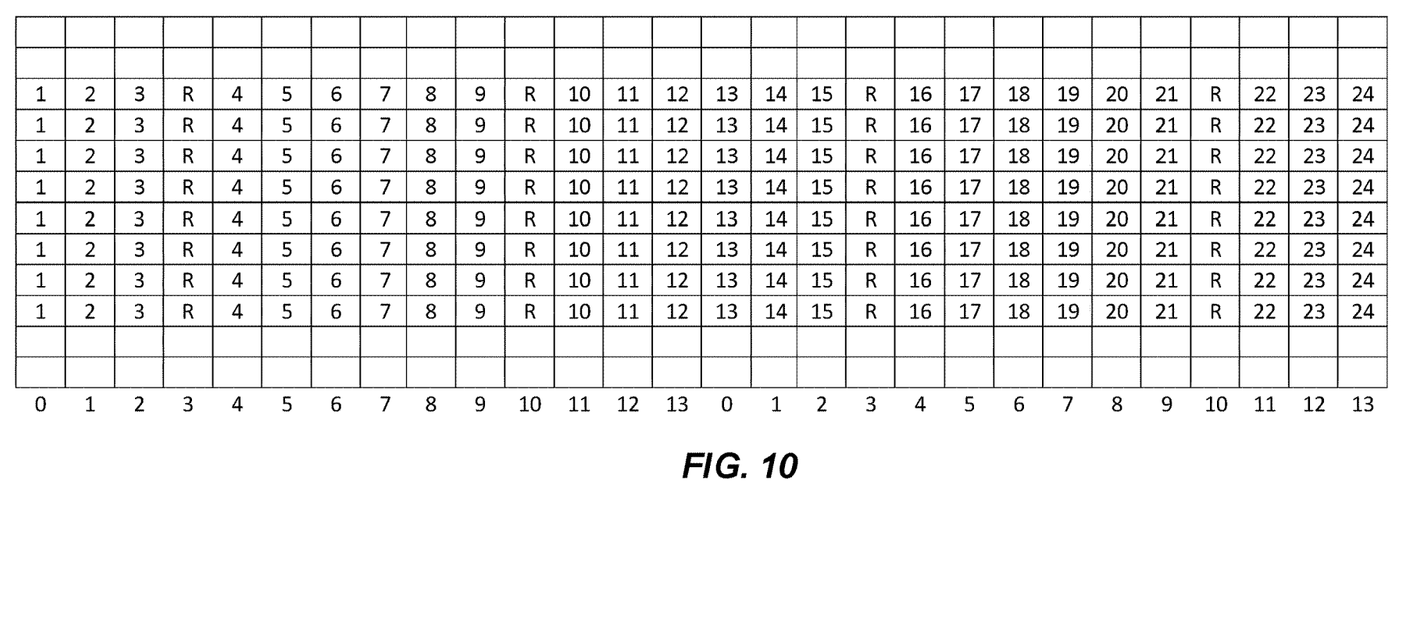
FIG. 10 is a diagram illustrating PUSCH transmissions based on one symbol time per TTI, with a DMRS transmission opportunity in every third and tenth symbol times of each subframe.

FIG. 9 illustrates a known arrangement for LTE, where TTIs span seven OFDM symbol times and where symbols 3 and 10 of every subframe are reserved for DMRS transmission. FIG. 10 illustrates a non-limiting but advantageous adaptation of that arrangement, which exploits the sub-subframe uplink scheduling enabled by the teachings herein. In FIG. 10, the reserved symbol times are retained, e.g., for use as "rescue" opportunities in cases where a UE misses its separate DMRS grant, or for use in making semi-persistent DMRS grants to UEs having uplink data to send. However, the TTI granularity is reduced to one OFDM symbol time, meaning that uplink data transmissions may be scheduled in any of the symbol times not reserved for DMRS.

Of course, in some embodiments, or under certain conditions or at certain times, there may not be any reserved symbol times, and DMRS transmissions and uplink data transmissions (PUSCH or PUCCH) can be separately scheduled at granularities down to the OFDM symbol time, at any position within the subframes and slots. Broadly, an eNB according to the teachings herein schedules DMRS transmissions from a UE separately from data transmissions, for a given frequency allocation. And, as noted, the UE may be configured such that, if the UE receives an UL grant without the UE having recently sent a DMRS on that frequency allocation, the UE transmits a DMRS symbol as well as the PUSCH data, e.g., using a pre-defined DMRS time location.

Among the several advantages gained from the teachings herein, scheduling DMRS independently from PUSCH transmissions can significantly reduce overhead from reference signals compared to always transmitting DMRS with every PUSCH transmission. Further, scheduling DMRS independently from PUSCH allows the eNB to obtain channel estimates from a UE and start decoding received PUSCH transmissions without having to wait for a predefined/restricted DMRS occurrence. For example, the eNB schedules one or more uplink reference signal transmissions by a UE to "sound" the channel in advance of scheduling and/or receiving scheduled uplink data transmissions.

Further, according to some embodiments, the eNB is configured to anticipate scheduling requests from the UE, such as by assuming that most DL assignments to the UE will lead to a TCP ACK coming back from the UE. Hence the eNB schedules a series of DMRS transmissions for the UE, together with making a DL assignment.

In yet a further embodiment, a UE is configured either by default or under network control to transmit a DMRS signal if it receives an UL grant and has not transmitted a DMRS recently. This approach ensures that each uplink data transmission is accompanied by a DMRS, and it allows the eNB to implicitly schedule a DMRS transmission simply by granting a data transmission.

Notably, modifications and other embodiments of the disclosed invention(s) will come to mind to one skilled in the art having the benefit of the teachings presented in the preceding descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method at a base station configured for operation in a wireless communication network, the method comprising:
   scheduling an uplink data transmission by a wireless device;
   determining that uplink channel conditions between the base station and the wireless device are stable, according to one or more channel metrics, and making a semi-persistent scheduling allocation to the wireless device, for sending the corresponding uplink reference signal transmission in association with sending the given data in a scheduled uplink data transmission; and
   scheduling an uplink reference signal transmission corresponding to the uplink data transmission, responsive to determining that the base station will not otherwise have a channel estimate that is valid for processing the uplink data transmission.

2. The method of claim 1, wherein scheduling the uplink data transmission by the wireless device comprises scheduling one or more uplink data transmissions by the wireless device to occur in one or more first scheduling intervals, and wherein scheduling the corresponding uplink reference signal transmission comprises scheduling one or more corresponding uplink reference signal transmissions by the wireless device to occur in one or more second scheduling intervals selected by the base station to occur within a defined temporal proximity of at least one of the first scheduling intervals.

3. The method of claim 1, wherein the corresponding uplink reference signal transmission by the wireless devices corresponds to the uplink data transmission by the wireless device based on the base station scheduling the corresponding uplink reference signal transmission to occur within a defined temporal proximity of the uplink data transmission and to span at least a same frequency interval as spanned by the uplink data transmission.

4. The method of claim 1, further comprising determining that the base station not otherwise have a channel estimate that is valid for processing the uplink data transmission by determining that, without receiving the corresponding uplink reference signal transmission, the base station will not have a channel estimate having temporal and spectral relevance to the uplink data transmission.

5. The method of claim 4, further comprising determining temporal relevance in dependence on evaluating how rapidly uplink channel conditions are changing between the wireless device and the base station.

6. The method of claim 1, further comprising not scheduling the corresponding uplink reference signal transmission responsive to determining that the base station has or will have a channel estimate that is valid for processing the uplink data transmission.

7. The method of claim 1, wherein, for a given one or more uplink data transmissions to be scheduled by the base station for the wireless device, the method comprises conditionally scheduling one or more corresponding uplink reference signal transmissions by the wireless device on an as-needed basis, based on at least one of:
   varying when or how many corresponding uplink reference signal transmissions by the wireless device are scheduled, in dependence on the base station evaluating how rapidly uplink channel conditions are changing between the base station and the wireless device; and
   varying when or how many corresponding uplink reference signal transmissions by the wireless device are scheduled, in dependence on a transmission format or formats associated with the given one or more uplink data transmissions.

8. The method of claim 1, wherein the base station operates as a serving base station with respect to the wireless device, or otherwise provides a radio connection to the communication network, for the wireless device.

9. The method of claim 1, wherein the communication network is configured as a Long Term Evolution (LTE) network, or as a LTE-Advanced network, according to Third Generation Partnership Project (3GPP) specifications, wherein the corresponding uplink reference signal transmission comprises a DeModulation Reference Symbol (DMRS) transmission, and wherein the uplink data transmission comprises a Physical Uplink Shared Channel (PUSCH) transmission or a Physical Uplink Control Channel (PUCCH) transmission.

10. The method of claim 9, wherein separately scheduling the uplink data transmission and the corresponding uplink reference sigma transmission by the wireless device comprises one of:
   sending a first Downlink Control Information (DCI) message to the wireless device to schedule the uplink data transmission, and sending a second DCI message to the wireless device to schedule the corresponding uplink reference signal transmission; and sending a DCI message to the wireless device that includes scheduling information for both the uplink data transmission and the corresponding uplink reference signal transmission.

11. The method of claim 1, wherein an uplink signal structure used by the wireless device and the base station defines transmission frames that are divided into subframes, with the subframes further divided into symbol periods, and wherein separately scheduling the uplink data transmission and the corresponding uplink reference signal transmission by the wireless device comprises scheduling one or more uplink data transmissions by the wireless device and scheduling one or more corresponding uplink reference signal transmissions by the wireless device, at a sub-subframe scheduling resolution, and wherein the sub-subframe scheduling resolution has a granularity of at least one symbol period but defines a scheduling interval of less than one subframe.

12. A base station configured for operation in a wireless communication network, the base station comprising:
a radio transceiver circuitry configured to send signals to a wireless device and to receive signals from a wireless device; and
a processing circuitry operatively associated with the radio transceiver circuitry and operative to
schedule an uplink data transmission by a wireless device;
determine that uplink channel conditions between the base station and the wireless device are stable, according to one or more channel metrics, and making a semi-persistent scheduling allocation to the wireless device, for sending the corresponding uplink reference signal transmission in association with sending the given data in a scheduled uplink data transmission; and
schedule an uplink reference signal transmission corresponding to the uplink data transmission, responsive to determining that the base station will not otherwise have a channel estimate that is valid for processing the uplink data transmission.

13. The base station of claim 12, wherein the processing circuitry is configured to schedule the uplink data transmission by the wireless device by scheduling one or more uplink data transmissions by the wireless device to occur in one or more first scheduling intervals, and to schedule the corresponding uplink reference signal transmission by scheduling one or more corresponding uplink reference signal transmissions by the wireless device to occur in one or more second scheduling intervals selected by the base station to occur within a defined temporal proximity of at least one of the first scheduling intervals.

14. The base station of claim 12, wherein the corresponding uplink reference signal transmission by the wireless devices corresponds to the uplink data transmission by the wireless device based on the base station being configured to schedule the corresponding uplink reference signal transmission to occur within a defined temporal proximity of the uplink data transmission and to span at least a same frequency interval as spanned by the uplink data transmission.

15. The base station of claim 12, wherein the processing circuitry is configured to determine that the base station will not otherwise have a channel estimate that is valid for processing the uplink data transmission by determining that, without receiving the corresponding uplink reference signal transmission, the base station will not have a channel estimate having temporal and spectral relevance to the uplink data transmission.

16. The base station of claim 15, wherein the processing circuitry is configured to determine temporal relevance in dependence on evaluating how rapidly uplink channel conditions are changing between the wireless device and the base station.

17. The base station of claim 12, wherein the processing circuitry is configured not to schedule the corresponding uplink reference signal transmission responsive to determining that the base station has or will have a channel estimate that is valid for processing, the uplink data transmission.

18. The base station of claim 12, wherein, for a given one or more uplink data transmissions to be scheduled by the base station for the wireless device, the processing circuitry is configured to conditionally schedule one or more corresponding uplink reference signal transmissions by the wireless device on an as-needed basis, based on at least one of:
varying when or how many corresponding uplink reference signal transmissions by the wireless device are scheduled, in dependence on evaluating how rapidly uplink channel conditions are changing between the base station and the wireless device; and
varying when or how many corresponding uplink reference signal transmissions by the wireless device are scheduled, in dependence on a transmission format or formats associated with the given one or more uplink data transmissions.

19. The base station of claim 12, wherein the base station is configured for operation as a serving base station with respect to the wireless device, or otherwise to provide a radio connection to the communication network, for the wireless device.

20. The base station of claim 12, wherein the communication network is configured as a Long Term Evolution (LTE) network, or as a LTE-Advanced network, according to Third Generation Partnership Project (3GPP) specifications, wherein the corresponding uplink reference signal transmission comprises a DeModulation Reference Symbol (DMRS) transmission, and wherein the uplink data transmission comprises a Physical Uplink Shared Channel (PUSCH) transmission or a Physical Uplink Control Channel (PUCCH) transmission.

21. The base station of claim 20, wherein the processing circuitry is configured to send a first Downlink Control Information (DCI) message to the wireless device to schedule the uplink data transmission, and sending a second DCI message to the wireless device to schedule the corresponding uplink reference signal transmission, or send a message to the wireless device that includes scheduling information for both the uplink data transmission and the corresponding uplink reference signal transmission.

22. The base station of claim 12, wherein an uplink signal structure used by the wireless device and the base station defines transmission frames that are divided into subframes, with the subframes further divided into symbol periods, and wherein the processing circuitry is configured to separately schedule the uplink data transmission and the corresponding uplink reference signal transmission by the wireless device based on being configured to schedule one or more uplink data transmissions by the wireless device and schedule one or more corresponding uplink reference signal transmissions by the wireless device, at a sub-subframe scheduling resolution, and wherein the sub-subframe, scheduling resolution has a granularity of at least one symbol period, but defines a scheduling interval of less than one subframe.

23. A method at a wireless device configured for operation in a wireless communication network, the method comprising:

receiving a first grant for an uplink data transmission and separately receiving a second grant for a corresponding uplink reference signal transmission by a wireless device; and transmitting uplink data according to the first grant and transmitting uplink reference signals according to the second grant, wherein receiving the second grant comprises receiving a semi-persistent scheduling grant and wherein performing the uplink reference signal transmission according to the second grant transmitting uplink reference signals in each of a number of scheduling intervals implicated by the semi-persistent scheduling grant.

24. The method of claim 23, wherein transmitting the uplink data according to the first grant and transmitting the uplink reference signals according to the second grant comprises transmitting the uplink data in a first scheduling interval allocated by the first grant and transmitting the uplink reference signals in a second scheduling interval allocated by the second grant.

25. The method of claim 24, wherein the first grant allocates frequency resources in a first frequency interval, and wherein the second grant allocates frequency resources at least spanning the first frequency interval.

26. The method of claim 23, further comprising autonomously deciding to transmit an uplink reference signal corresponding to a given uplink data transmission by the wireless device, responsive to determining that there would otherwise be no uplink reference signal transmission having temporal and spectral relevance to the given uplink data transmission.

27. A wireless device configured for operation in a wireless communication network, the wireless device comprising:

radio transceiver circuitry configured to send signals to the wireless communication network and to receive signals from the wireless communication network; and processing circuitry operatively associated with the radio transceiver circuitry and configured to:

receive a first grant for an uplink data transmission and separately receive a second grant for a corresponding uplink reference signal transmission by the wireless device; and transmit uplink data according to the first grant and transmit uplink reference signals according to the second grant, wherein the second grant comprises a semi-persistent scheduling grant and wherein the processing circuitry is configured to transmit uplink reference signals in each of a number of scheduling intervals implicated by the semi-persistent scheduling grant.

28. The wireless device of claim 27, wherein the processing circuitry is configured to transmit the uplink data in a first scheduling interval allocated by the first grant and transmit the uplink reference signals in a second scheduling interval allocated by the second grant.

29. The wireless device of claim 28, wherein the first grant allocates frequency resources in a first frequency interval, and wherein the second grant allocates frequency resources at least spanning the first frequency interval.

30. The wireless device of claim 27, wherein the processing circuitry is configured to autonomously decide to transmit an uplink reference signal corresponding to a given unlink data transmission by the wireless device, responsive to determining that there would otherwise be no uplink reference signal transmission having spectral and temporal relevance to the given uplink data transmission.

* * * * *